US012509328B2

(12) United States Patent
Wang

(10) Patent No.: US 12,509,328 B2
(45) Date of Patent: Dec. 30, 2025

(54) DEVICE AND METHOD FOR DETECTING ELEVATOR ROPE ELONGATION AND ELEVATOR

(71) Applicant: Otis Elevator Company, Farmington, CT (US)

(72) Inventor: Wei Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 875 days.

(21) Appl. No.: 17/836,415

(22) Filed: Jun. 9, 2022

(65) Prior Publication Data

US 2023/0128264 A1 Apr. 27, 2023

(30) Foreign Application Priority Data

Oct. 25, 2021 (CN) ......................... 202111240530.X

(51) Int. Cl.
*B66B 7/12* (2006.01)
*B66B 3/00* (2006.01)

(52) U.S. Cl.
CPC ............ *B66B 7/1215* (2013.01); *B66B 3/002* (2013.01)

(58) Field of Classification Search
CPC .............................. B66B 7/1215; B66B 3/002
USPC .......................................................... 187/393
See application file for complete search history.

(56) References Cited

U.S. PATENT DOCUMENTS 5,421,433 A * 6/1995 Yoo ....................... B66B 1/3484 177/168
5,509,638 A * 4/1996 Leon-Vieito .......... B66C 23/166 254/362
5,611,412 A * 3/1997 Yoo ........................... B66B 7/10 187/412
7,574,911 B2 8/2009 McSheffrey et al.
7,728,715 B2 6/2010 Riedel et al.
8,248,216 B2 8/2012 Riedel et al.
8,842,016 B1 9/2014 Cazanas et al.
8,981,927 B2 3/2015 McSheffrey
(Continued)

FOREIGN PATENT DOCUMENTS

CN 100340807 C 10/2007
CN 101799687 B 11/2012
(Continued)

OTHER PUBLICATIONS

European Search Report for Application No. 22202568.6; Issued Feb. 16, 2023; 7 Pages.

*Primary Examiner* — Erick D Glass
(74) *Attorney, Agent, or Firm* — CANTOR COLBURN LLP

(57) ABSTRACT

A device and a method for detecting elevator rope elongation, and an elevator. An elevator rope is connected to a rope head device and an operating device in an elevator, and the device for detecting elevator rope elongation includes: one and more brackets connected to an elastic reset member in the rope head device, a coupling member connected to at least one of the brackets and configured to be driven into a trigger position by the at least one bracket when the displacement of the elastic reset member exceeds a threshold value due to reduction of compression amount, and a trigger connected to the coupling member and configured to be triggered to generate a trigger signal when the coupling member is driven into the trigger position.

16 Claims, 3 Drawing Sheets

(56) References Cited

U.S. PATENT DOCUMENTS

| | | | |
|---|---|---|---|
| 9,041,534 B2 | 5/2015 | McSheffrey | |
| 9,478,121 B2 | 10/2016 | McSheffrey | |
| 9,606,013 B2 | 3/2017 | McSheffrey, Jr. et al. | |
| 9,609,287 B2 | 3/2017 | McSheffrey | |
| 10,970,578 B2 | 4/2021 | Moore et al. | |

FOREIGN PATENT DOCUMENTS

| | | | |
|---|---|---|---|
| CN | 206347281 | U | 7/2017 |
| CN | 102597720 | B | 11/2017 |
| CN | 108025891 | A | 5/2018 |
| CN | 108561751 | A | 9/2018 |
| CN | 109395302 | A | 3/2019 |
| CN | 110545410 | A | 12/2019 |
| CN | 111569346 | A | 8/2020 |
| CN | 109646847 | B | 1/2021 |
| CN | 212840583 | U | 3/2021 |
| EP | 2335422 | B1 | 12/2013 |
| EP | 2687269 | B1 | 1/2017 |
| EP | 2944536 | B1 | 12/2019 |
| KR | 120210075597 | A | 6/2021 |
| WO | 2016137195 | A1 | 9/2016 |
| WO | 2019081793 | A1 | 5/2019 |
| WO | 2020094890 | A1 | 5/2020 |
| WO | 2020117904 | A1 | 6/2020 |

* cited by examiner

DEVICE AND METHOD FOR DETECTING ELEVATOR ROPE ELONGATION AND ELEVATOR

FOREIGN PRIORITY

This application claims priority to Chinese Patent Application No. 202111240530.X, filed Oct. 25, 2021, and all the benefits accruing therefrom under 35 U.S.C. § 119, the contents of which in its entirety are herein incorporated by reference.

TECHNICAL FIELD

The present disclosure relates to elevator technology field, more particularly, to a device and a method for detecting elevator rope elongation, and an elevator.

BACKGROUND

In an elevator, ropes such as steel wire rope and steel belt are usually used to provide the traction force output from the traction machine to the elevator car or counterweight so as to drive the elevator car or counterweight to move up and down to reach the target floor position. Since most of these elevator ropes bear large loads for a long time, it is necessary to detect the elongation rate of these elevator ropes during the use of the elevator for safety and other reasons, so as to avoid the formation of accidents due to exceptional situations or even breakage caused by slackness in ropes.

Although the prior art has provided some technical means to detect the elongation rate of elevator rope, the inventor of this case found that they all have their limitations. For example, many existing detection devices are only applicable to specific elevator environments, for example, they are only allowed to be installed on elevator equipment with two steel belts, and cannot be applied to other elevator equipment with more steel belts. For another example, many detection devices also have problems such as complicated structure, limited installation and arrangement location, low detection sensitivity and unable to detect relatively small rope elongation rate, and false detection trigger and other situations may occur easily in the case of elevator emergency stop.

SUMMARY

In view of the foregoing, the present disclosure provides a device and a method for detecting elevator rope elongation and elevator so that one or more of the above-described problems and other problems existing in the prior art can be solved or at least alleviated, or an alternative technical solution can be provided for the prior art.

Firstly, according to an aspect of the present disclosure, there is provided a device for detecting elevator rope elongation, the elevator rope being connected to a rope head device and an operating device in an elevator, wherein the device for detecting elevator rope elongation includes:

- one and more brackets connected to an elastic reset member in the rope head device;
- a coupling member connected to at least one of the brackets and configured to be driven into a trigger position by the at least one bracket when the displacement of the elastic reset member exceeds a threshold value due to reduction of compression amount; and

- a trigger connected to the coupling member and configured to be triggered to generate a trigger signal when the coupling member is driven into the trigger position.

In the device for detecting elevator rope elongation according to the present disclosure, optionally, the bracket is provided with one or more holes for the coupling member to pass therethrough, and the bracket is arranged so that at least one of the holes is located between two adjacent elastic reset members.

In the device for detecting elevator rope elongation according to the present disclosure, optionally, the aperture of the hole is configured so that the coupling member passes through the hole and does not contact at least a portion of the inner wall of the hole during installation, and the coupling member contacts the inner wall and is driven into the trigger position by the bracket when the displacement of the elastic reset member exceeds the threshold value.

In the device for detecting elevator rope elongation according to the present disclosure, optionally, the coupling member is configured to pass through the at least one of the holes on each of the brackets, and both ends of the coupling member are respectively fixed on any two brackets or a same bracket of the brackets.

In the device for detecting elevator rope elongation according to the present disclosure, optionally, the bracket is provided with at least two protrusions, and the holes are provided on the protrusions.

In the device for detecting elevator rope elongation according to the present disclosure, optionally, the coupling member is arranged to form an extension section through the holes located on the protrusions.

In the device for detecting elevator rope elongation according to the present disclosure, optionally, the extension section has a first section and a second section, the first section and the second section respectively located on either side of the elastic reset member and substantially parallel with each other.

In the device for detecting elevator rope elongation according to the present disclosure, optionally, at least one of the brackets is provided with a fixing part for fixing the ends of the coupling member thereon.

In the device for detecting elevator rope elongation according to the present disclosure, optionally, the bracket is provided with a installing hole, the elastic reset member is sleeved on a connecting rod in the rope head device and one end thereof rests against a rope head plate in the rope head device, and the other end rests against the bracket which is sleeved on an end of the connecting rod through the installing hole.

In the device for detecting elevator rope elongation according to the present disclosure, optionally, the trigger is provided on at least one of the brackets and includes a switch component.

In the device for detecting elevator rope elongation according to the present disclosure, optionally, the coupling member is a wire rope.

In the device for detecting elevator rope elongation according to the present disclosure, optionally, the length of the coupling member is configured based on the elongation rate detection sensitivity of the elevator rope.

In the device for detecting elevator rope elongation according to the present disclosure, optionally, the elastic reset member is a compression spring, and/or the operating device is an elevator car or a counterweight.

In the device for detecting elevator rope elongation according to the present disclosure, optionally, the trigger signal is used for being transmitted to a control device in the elevator.

Furthermore, according to another aspect of the present disclosure, an elevator is provided, the elevator is provided with the device for detecting elevator rope elongation as described in any one of the above items.

In addition, according to still another aspect of the present disclosure, there is provided a method for detecting elevator rope elongation, which includes the following steps:

arranging the device for detecting elevator rope elongation as described in any one of the above items in the elevator;

detecting whether the trigger signal is output from the device for detecting elevator rope elongation during the operation of the elevator; and determining that current elongation rate of the elevator rope has exceeded a preset value if the trigger signal is detected.

From the following detailed description combined with the drawings, the principles, features, characteristics and advantages of each technical solution according to the present disclosure will be clearly understood. The present disclosure can be widely applied to the detection of rope elongation condition in many types of elevator equipment. It has the features of compact structure, low cost, easy to install and use, high detection sensitivity, and can effectively avoid situations like false detection trigger, which is of positive significance for real-time monitoring of elevator rope condition, ensuring elevator safety and reliability, etc.

BRIEF DESCRIPTION OF THE DRAWINGS

The technical solution of the present disclosure will be further described in detail hereinafter in connection with the drawings and the embodiments, but it should be understood that these drawings are designed for the explanatory purpose only and are intended only to conceptually illustrate the structural construction described herein, and are not necessarily drawn to scale.

DETAILED DESCRIPTION

Figure 1:
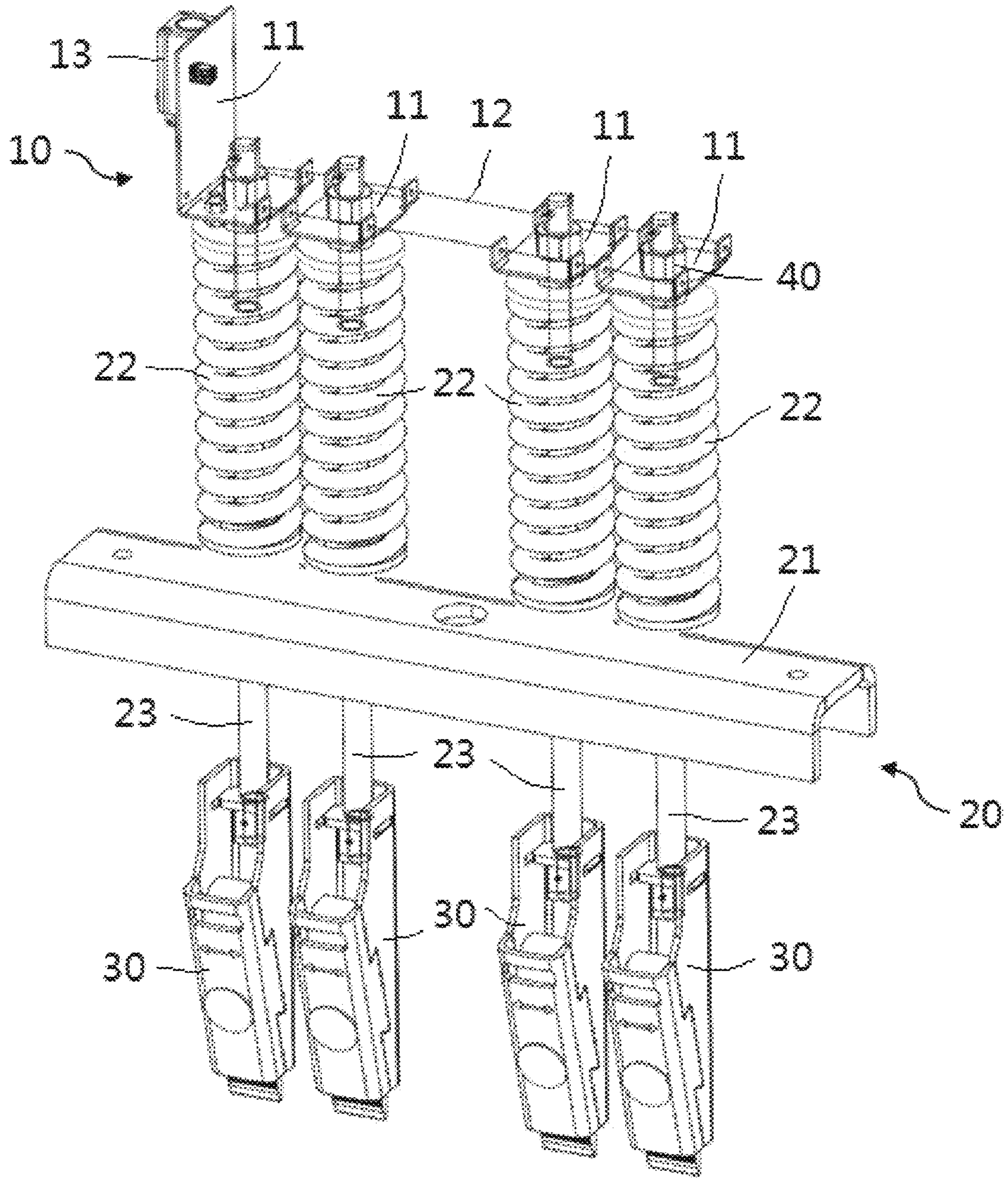
FIG. 1 is a perspective structural diagram of an embodiment of a device for detecting elevator rope elongation according to the present disclosure installed in an elevator example.
Figure 2:
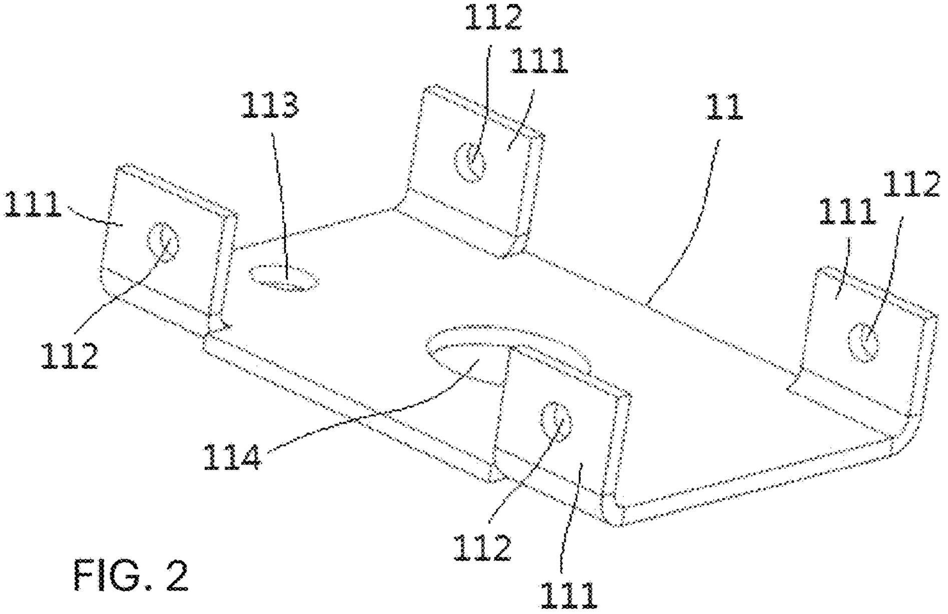
FIG. 2 is a perspective structural diagram of a bracket in the embodiment shown in FIG. 1.

First of all, it should be noted that the structure, composition, characteristics and advantages of the device and method for detecting elevator rope elongation and the elevator according to the present disclosure will be described hereinafter by way of example. However, all the descriptions shall not be used to form any limitations to the present disclosure. For any single technical feature described or implied in the embodiments mentioned herein, or any single technical feature shown or implied in the drawings, the present disclosure still allows any combination or deletion between these technical features (or their equivalents) without any technical obstacles, so that these further embodiments according to the present disclosure should be considered to be within the scope of this application.

Herein, the technical terms "first", "second" are used only for the purpose of distinguishing expressions, and are not intended to indicate their order and relative importance. The technical term "connection (or interconnection and the like)" covers the direct or indirect connection of a particular component to another component, and the same also applies to the technical terms such as "against" and "bear". The technical term "substantially" is intended to include non-substantive tolerance associated with the measurement of specific measurements, for example may include set values and their ranges of ±8%, ±5% or ±2%. In addition, for the sake of brevity, general matters already known to those skilled in the art, such as aspects regarding the basic principles of elevator ropes, rope head devices, trigger switches, trigger signal processing and the like are not repeated herein.

In FIGS. 1-5, a general situation is schematically illustrated wherein an embodiment of a device for detecting elevator rope elongation according to the present disclosure is installed in an elevator. Specifically, in the given example, the device for detecting elevator rope elongation 10 may be installed and connected to the rope head device 20 in the elevator, so as to be used to detect the actual elongation condition of the elevator rope during operation.

In order to simplify the drawings, elevator ropes are not illustrated in the drawings. However, it should be noted that the present disclosure does not make any limitation for such elevator ropes, which may be used in practical application in any feasible form such as steel wire rope, steel belt and the like, through which it is used to connect with the operating device, such as elevator car, counterweight, etc. in the elevator, so as to provide the latter with traction force output from power equipment, such as traction machine and the like. Typically, parts such as pulley assembly 30 and the like may be used to connect the elevator ropes with the rope head device 20, which may generally be arranged in the machine room located for example at the top of the elevator, which may include for example rope head plate 21, elastic reset members 22, such as compression springs and the like, and connecting rod 23. The specific composition of these components, their respective structural construction and quantity may be different in different elevator equipment, allowing for flexible configuration.

Since the elevator ropes have to bear the own weight or load of the operating device (such as personnel, animals, goods and the like currently carried in the elevator car) during use, and have to withstand a relatively large traction force, there is a possibility of slackening or even breaking after being used for a certain period of time. For example, by using the device for detecting elevator rope elongation 10 as shown in FIG. 1, the current elongation condition of the elevator rope may be accurately and reliably detected, and the elevator ropes that have slackened beyond expectation may be found in time, so as to effectively avoid further unexpected safety accidents.

Referring to FIGS. 1-5 in combination, the device for detecting elevator rope elongation 10 may include brackets 11, a coupling member 12 and a trigger 13. One or more brackets 11 may be provided according to the actual situation. For example, a separate bracket may be configured for each elastic reset member 22 according to the specific quantity of elastic reset members 22 in the rope head device 20, or a relatively large bracket may be configured together with several elastic reset members 22 therein. In addition, any two different brackets may be the same or different in terms of structural construction, use of materials, etc.

The bracket 11 may be connected to the elastic reset members 22 in the rope head device 20 by any feasible connection means, for example by providing an installing hole 114 in the bracket 11 and then passing the bracket 11 through the end of the connecting rod 23 via the installing hole 114 and securing it to the connecting rod 23 by means of an attachment 40 then resting against one end of the elastic reset members 22, the elastic reset members 22 is also sleeved on the connecting rod 23 and another end thereof rests against the rope head plate.

Since the elastic reset members 22 will be compressed under the action of the force transmitted via the elevator rope and the intermediate parts such as the pulley assembly 30 and the connecting rod 23, and during the use of the elevator, with the dynamic change of the elevator traction force carried by the elevator ropes, it will lead to a corresponding change of the compression amount of the elastic reset members 22, thus the bracket 11 connected to the elastic reset members 22 may be driven to carry out displacement movement with it, the change amount of this displacement movement corresponds to the current actual elongation condition of the elevator rope. For example, when the elevator rope has reached a certain extent of slack, it will cause the force acting on the elastic reset members 22 to become smaller and make the compression amount of the elastic reset members 22 become smaller accordingly, and further cause the elastic reset members 22 to drive the connected bracket 11 to produce displacement movement together. By detecting the above displacement movement change via the device for detecting elevator rope elongation 10, the real elongation condition of the elevator rope at this time can be obtained.

Figure 3:
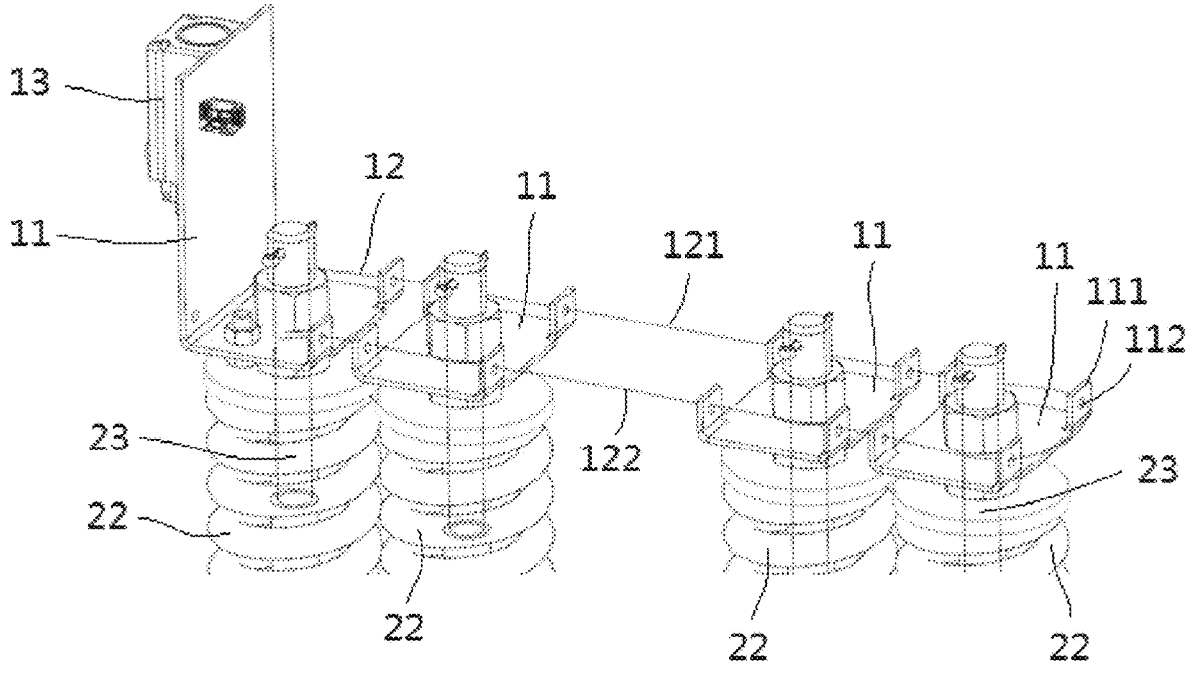
FIG. 3 is a partial perspective structural diagram of the embodiment shown in FIG. 1.
Figure 4:
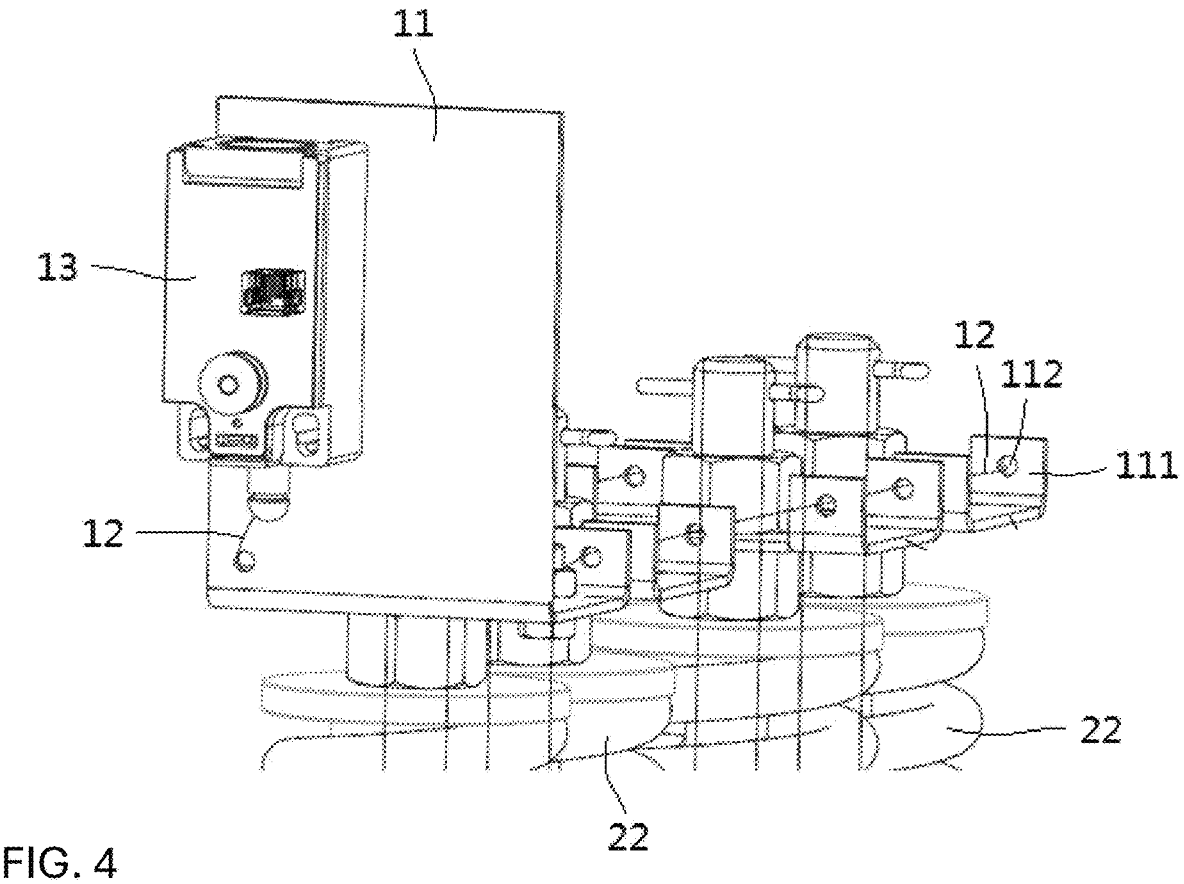
FIG. 4 is another partial perspective structure diagram of the embodiment shown in FIG. 1.
Figure 5:
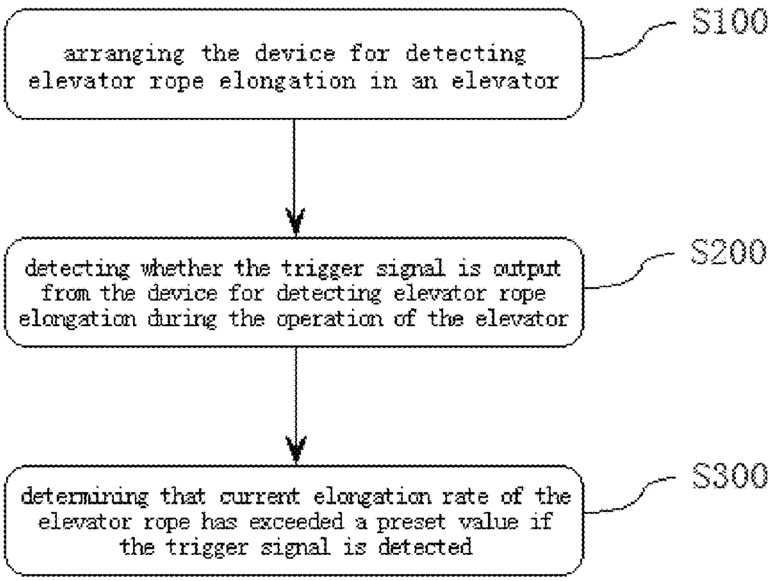
FIG. 5 is a flowchart of an embodiment of a method for detecting elevator rope elongation according to the present disclosure.

As shown in FIGS. 1, 3 and 4, the coupling member 12 may be arranged in connection with the bracket 11, so as to be used to detect the displacement movement changes described above, i.e., to detect the elongation condition of the elevator rope. As described above, the coupling member 12 may be configured so that when the elastic reset members 22 are displaced for reduced compression and the displacement exceeds a threshold value (the threshold value may be set flexibly according to the specific application requirements, for example, it may be related to the requirements for test sensitivity in different occasions and other aspects), the coupling member 12 is driven into the trigger position following the bracket 11. At this time, the trigger 13 may be further triggered to generate a trigger signal. For example, the trigger 13 may generate the trigger signal in a very convenient way by means of, e.g., a switch component (such as a resettable switch component). According to the actual layout and use requirements of different applications and other considerations, the trigger 13 may be separately provided on one bracket 11 or multiple triggers 13 may be provided on multiple brackets 11 at the same time, so as to better meet various application requirements.

Once the above trigger signal is generated, it may indicate that the current elongation rate of the elevator rope has exceeded the preset situation (i.e. the slackness of the elevator rope does not met the expectation any more), and therefore, corresponding processing measures need to be taken, such as braking or reducing the speed of the operating device, displaying a safety warning in the elevator management system, sending safety warnings to relevant personnel (such as maintenance personnel, management personnel, etc.), inspecting or replacing operation to the elevator ropes, etc., so as to avoid unexpected equipment damage, personal injury and other accidents. In practical applications, the above trigger signals may be optionally transmitted directly to the control device in the elevator (such as elevator controller and the like), so that the latter may take corresponding processing measures upon receiving the trigger signal so as to ensure the safety of the system. It should be understood that the above trigger signal may be generated based on a mechanical trigger action, but thereafter it may be transformed into an electrical signal through any feasible processing method and then transmitted to the control device in the elevator for subsequent analysis and processing.

With continued reference to FIGS. 1, 3 and 4, in the device for detecting elevator rope elongation 10, the coupling member 12 may employ the form of wire rope and the like, which may specifically be made of metal material, composite material or combinations thereof. As an exemplary illustration, one, two or more holes 112 may be provided in the bracket 11 as required. For example, one or more protrusions 111 may be provided on the bracket 11 and the holes 112 may be arranged therein, so as to form various feasible arrangements for detecting the elevator rope elongation condition after passing the coupling member 12 through one, some or all of the holes 112.

For example, the ends of the coupling member 12 may be fixed on any two of these brackets 11 respectively, or both ends of the coupling member 12 may be fixed on one of these brackets at the same time, for example by fixing the end of the coupling member 12 to the fixing part 113 optionally arranged on one or some of the brackets 11. For example, the fixing part 113 may employ the form of holes, protrusions, buckles and the like. For another example, the coupling member 12 may be passed through the holes 112 located on some protrusions 111, so as to form an extension section with a certain length that meets the specific application requirements, such as forming a circuit with a single loop, two loops or multiple loops, and may form a closed or non-closed structure. By employing the above arrangement in series, it is advantageous to form the integrity test of several elevator ropes and timely find the possible existing problems in some elevator ropes. As an optional situation, for example, as shown in FIG. 3, the coupling member 12 may be arranged to form two sections substantially parallel to each other, i.e., the first section 121 and the second section 122 schematically indicated in the figure, which may be arranged on either side of the elastic reset members 22 to form a loop layout. In this way, it will help to improve the detection range of the device for detecting elevator rope elongation, so as to detect the displacement changes of the elastic reset members 22 more quickly, fully and accurately, which will be very helpful in achieving relatively higher detection sensitivity of elevator rope elongation.

In specific use, the actual length of the coupling member 12 may be flexibly configured according to the actual requirements of the detection sensitivity of elevator rope elongation rate, i.e., the length of the coupling member 12 may be adjusted to meet different sensitivity requirements of elongation rate detection. For example, when the test requirements are relatively low, the length of the coupling member 12 may be configured to be relatively long, so that, thus, the coupling member 12 is allowed to have a relatively large margin for a relatively slow response, i.e., the detection sensitivity of the elevator rope elongation rate is relatively low; otherwise, the situation in the above description is completely opposite, so it will not be repeated. In contrast, the current elevator rope elongation rate detection technologies cannot provide the above test flexibility, and they can be applied only to the occasions with fixed detection sensitivity, and cannot meet different detection sensitivity requirements by using the same device.

It should be noted that, according to different application requirements, the present disclosure allows flexibly select and configure the structural construction, quantity, position layout, use of materials, etc. of the above brackets, coupling members and triggers. For example, in some embodiments, it is allowed to install and arrange one bracket 11 only on some of the elastic reset members 22, i.e., optionally, it is not necessary to arrange one bracket 11 separately on each elastic reset member 22. In addition, the bracket 11 may be installed and arranged so that one or more holes 112 are located between two elastic reset members 22 adjacent to each other, so as to arrange the coupling member 12 and the trigger 13 as required and detect the elongation condition of the corresponding elevator ropes with these adjacent elastic reset members 22.

In addition, in some embodiments, the aperture of the holes 112 in the bracket may be configured so that the coupling member 12 passes through the holes 112 during installation, but at the same time, it substantially does not contact the inner wall of the holes 112 or may contact only a part of the inner wall of the holes 112 (for example, when it employs the form of wire rope, its diameter may be made smaller than the aperture of the holes 112 so as to pass through the holes 112 during installation. However, after the installation is completed, the wire rope will contact a part of the inner wall (such as the lower part) due to the influence of gravity or the elasticity of the selected wire rope itself and other aspects. Therefore, a certain amount of contact margin may be provided, so as to avoid the problem of false detection trigger that may occur in the prior art in case of elevator emergency stop operation and other situations. In case of using the above configuration, by configuring the aperture, the coupling member and the like as required to select the above contact margin, only when the displacement of the elastic reset members 22 exceeds the desired preset threshold, may the coupling member 12 be allowed to contact the corresponding inner wall (such as the upper part and the like) where it does not previously contact with the holes 112 and then it is driven into a trigger position by the bracket 11, and further the trigger 13 is triggered to form a trigger signal, which may not only avoid the problem of false detection trigger, but also flexibly achieve the different detection sensitivity requirements for the elongation rate of elevator rope. Of course, it should be understood that the coupling member 12 is allowed to employ other forms such as iron wire and the like, as long as it can meet actual test requirements for the elongation rate of elevator rope in specific applications.

According to the design idea of the present disclosure, a method for detecting elevator rope elongation is further provided. For example, as shown in FIG. 6, it may include the following steps:

In step S100, the device for detecting elevator rope elongation designed and provided according to the present disclosure may be provided in an elevator, for example, on the rope head device in the elevator as previously mentioned.

In step S200, during the operation of the elevator, detecting whether a trigger signal is output from the device for detecting elevator rope elongation. With regard to the formation of the trigger signal and the like, reference may be made to the detailed description in the above corresponding part, and the description will not be repeated herein.

Once the above trigger signal is detected, it may be determined in step S300 that the current elongation rate of the elevator rope has exceeded the preset value; otherwise, it is continued to detect whether the trigger signal has been output from the device for detecting elevator rope elongation.

By employing the above detection method, the elongation condition of elevator rope can be detected in a timely, accurate and reliable manner, and the detection sensitivity may be adjusted and set quite conveniently and flexibly according to different requirements as previously mentioned. At the same time, false detection trigger and other situations may be avoided. Therefore, it is quite significant in terms of compatibility, practicability and other aspects; it is possible to effectively monitor the elevator rope condition, and to ensure and improve the safety performance in use of the elevator.

In addition, according to the technical solution of the present disclosure, an elevator is also provided. The device for detecting elevator rope elongation designed and provided according to the present disclosure may be provided in the elevator, so as to overcome the defects and shortcomings of the prior art detection device mentioned above, especially in terms of avoiding false detection trigger, meeting different detection sensitivity requirements, convenience in installation and maintenance, safety and reliability, it has quite obvious technical advantages as compared with the prior art.

The device and method for detecting elevator rope elongation and the elevator according to the present disclosure have been elaborated above in detail by way of example only. These individual examples are merely for illustrating the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the claims of the present disclosure.

What is claimed is:

1. A device for detecting elevator rope elongation, the elevator rope being connected to a rope head device and an operating device in an elevator, wherein the device for detecting elevator rope elongation comprises:

one and more brackets connected to an elastic reset member in the rope head device;

a coupling member connected to at least one of the brackets and configured to be driven into a trigger position by the at least one bracket when the displacement of the elastic reset member exceeds a threshold value due to reduction of compression amount; and a trigger connected to the coupling member and configured to be triggered to generate a trigger signal when the coupling member is driven into the trigger position.

2. The device for detecting elevator rope elongation of claim 1, wherein the bracket is provided with one or more holes for the coupling member to pass therethrough, and the bracket is arranged so that at least one of the holes is located between two adjacent elastic reset members.

3. The device for detecting elevator rope elongation of claim 2, wherein the aperture of the hole is configured so that the coupling member passes through the hole and does not contact at least a portion of the inner wall of the hole during installation, and the coupling member contacts the inner wall and is driven into the trigger position by the bracket when the displacement of the elastic reset member exceeds the threshold value.

4. The device for detecting elevator rope elongation of claim 2, wherein the coupling member is configured to pass through the at least one of the holes on each of the brackets, and both ends of the coupling member are respectively fixed on any two brackets or a same bracket of the brackets.

5. The device for detecting elevator rope elongation of claim 2, wherein the bracket is provided with at least two protrusions, and the holes are provided on the protrusions.

6. The device for detecting elevator rope elongation of claim 5, wherein the coupling member is arranged to form an extension section through the holes located on the protrusions.

7. The device for detecting elevator rope elongation of claim 6, wherein the extension section has a first section and a second section, the first section and the second section respectively located on either side of the elastic reset member and substantially parallel with each other.

8. The device for detecting elevator rope elongation of claim 2, wherein at least one of the brackets is provided with a fixing part for fixing the ends of the coupling member thereon.

9. The device for detecting elevator rope elongation of claim 1, wherein the bracket is provided with a installing hole, the elastic reset member is sleeved on a connecting rod in the rope head device and one end thereof rests against a rope head plate in the rope head device, and the other end rests against the bracket which is sleeved on an end of the connecting rod through the installing hole.

10. The device for detecting elevator rope elongation of claim 1, wherein the trigger is provided on at least one of the brackets and includes a switch component.

11. The device for detecting elevator rope elongation of claim 1, wherein the coupling member is a wire rope.

12. The device for detecting elevator rope elongation of claim 11, wherein the length of the coupling member is configured based on the elongation rate detection sensitivity of the elevator rope.

13. The device for detecting elevator rope elongation of claim 1, wherein the elastic reset member is a compression spring, and/or the operating device is an elevator car or a counterweight.

14. The device for detecting elevator rope elongation of claim 1, wherein the trigger signal is used for being transmitted to a control device in the elevator.

15. An elevator, which is provided with the device for detecting elevator rope elongation according to claim 1.

16. A method for detecting elevator rope elongation, comprising:

arranging the device for detecting elevator rope elongation according to claim 1 in an elevator;

detecting whether the trigger signal is output from the device for detecting elevator rope elongation during the operation of the elevator; and determining that current elongation rate of the elevator rope has exceeded a preset value if the trigger signal is detected.

* * * * *